US012625223B2

(12) United States Patent
Dal Santo et al.

(10) Patent No.: US 12,625,223 B2
(45) Date of Patent: May 12, 2026

(54) PROACTIVE RECORDING OF LOCATIONS FOR BACKTRACKING

(71) Applicant: Apple Inc., Cupertino, CA (US)

(72) Inventors: Michael P. Dal Santo, San Francisco, CA (US); Christine Zhu, Sunnyvale, CA (US); Adam M. Driscoll, Atherton, CA (US); Brandon J. Van Ryswyk, Los Altos, CA (US); Richard B. Warren, Redwood City, CA (US); Jared K. McGann, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 18/299,011

(22) Filed: Apr. 11, 2023

(65) Prior Publication Data

US 2023/0358847 A1     Nov. 9, 2023

Related U.S. Application Data

(60) Provisional application No. 63/339,863, filed on May 9, 2022.

(51) Int. Cl.
*G01S 5/02*          (2010.01)
*H04W 64/00*      (2009.01)

(52) U.S. Cl.
CPC ......... *G01S 5/0284* (2013.01); *H04W 64/003* (2013.01)

(58) Field of Classification Search
CPC .......... G01S 5/0284; G01S 5/01; G01S 19/03; H04W 64/003; H04W 4/029; G06V 20/52;

(Continued)

(56) References Cited

U.S. PATENT DOCUMENTS 6,024,655 A     2/2000   Coffee
6,259,381 B1   7/2001   Small
(Continued)

FOREIGN PATENT DOCUMENTS

EP        1777540 A1     4/2007
EP        2759804 A1     7/2014
(Continued)

OTHER PUBLICATIONS

Aljohani et al., "Predicting At-Risk Students Using Clickstream Data in the Virtual Learning Environment", 12 pages.
(Continued)

*Primary Examiner* — Nimesh Patel
(74) *Attorney, Agent, or Firm* — Kilpatrick Townsend & Stockton LLP

(57)          ABSTRACT

Methods, non-transitory machine-readable mediums, and system to provide historical positioning information are described. In an embodiment, a device detects one or more conditions in user contextual data that trigger collection of a set of historical positions for a lookback window, the device receives at least one historical position from the set of historical positions for the lookback window, the device classifies the at least one historical position based on one or more features as a candidate location for a backtrack route, and the device determines to provide the at least one historical position as part of the lookback window based on the classification.

21 Claims, 12 Drawing Sheets

(58) Field of Classification Search

CPC .... G06V 10/82; G06V 40/166; G06V 40/172;
G06V 10/764; G06V 40/171; G06V
20/50; G06V 40/103; G06V 20/44; G06V
20/64; G06V 40/10; G06V 10/235; G06V
10/267; G06V 20/58; G06V 10/24; G06V
20/70; G06V 2201/10; G06V 40/19;
G06V 20/40; G06V 40/161; G06V 10/10;
G06V 20/48; G06F 21/32; G06F 3/04845;
G06F 16/532; G06F 3/0485; G06F
3/04842; G06F 16/738; G06F 18/24;
G06F 16/743; G06F 18/214; G06F 18/22;
G06F 16/285; G06F 18/00; G06F 16/783;
G06F 16/00; G06F 18/23; G06F 16/9535;
G06F 16/3329; G06F 16/287; G06F
16/24575; G06F 16/355; G06F 16/53;
G06F 16/289; G06F 16/5846; G06F
16/583; G06F 2218/12; G06N 3/045;
G06N 3/08; G06N 20/00; G06N 3/04;
G06N 3/084; G06N 3/088; G06N 3/047;
G06N 3/006; G06N 5/01; G06N 5/022;
G06N 7/01; G06N 3/042; G06N 5/025;
G06N 5/042; G06N 5/045; G06N 3/0464;
G06N 3/094; G06N 3/008; G06N 5/047;
G06N 3/02; G06N 3/09; G06N 3/0475;
G10L 15/08; G10L 13/02; G10L 15/16;
G10L 13/027; G10L 17/04; G10L 17/10;
G10L 17/18; G10L 17/26; G06T
2207/20081; G06T 2207/20084; G06T
2207/10016; G06T 7/246; G06T 7/292;
G06T 7/70; G06T 7/74; G06T
2207/30232; G06T 7/97; G06T 2210/21;
G06T 7/593; G06T 7/75; G06T
2207/10012; G06T 7/579; G06T 7/73;
G06T 2207/20132; G06T 7/251; G06T
7/60; G06T 7/194; G06T 7/33
See application file for complete search history.

(56) References Cited

U.S. PATENT DOCUMENTS

| | | | |
|---|---|---|---|
| 6,542,814 | B2 | 4/2003 | Polidi et al. |
| 6,865,476 | B1 | 3/2005 | Jokerst, Sr. |
| 7,317,927 | B2 | 1/2008 | Staton et al. |
| 7,480,566 | B1 | 1/2009 | Laverty |
| 7,493,211 | B2 | 2/2009 | Breen |
| 7,561,063 | B2 | 7/2009 | Eckhart |
| 8,774,827 | B2 | 7/2014 | Scalisi et al. |
| 8,825,404 | B2 | 9/2014 | Mays |
| 8,995,322 | B2 | 3/2015 | Huang et al. |
| 9,210,545 | B2 | 12/2015 | Sabatelli et al. |
| 9,648,581 | B1 | 5/2017 | Vaynblat et al. |
| 9,741,191 | B1 | 8/2017 | Wong |
| 11,150,660 | B1 | 10/2021 | Kabirzadeh et al. |
| 2007/0143013 | A1 | 6/2007 | Breen |
| 2007/0219706 | A1 | 9/2007 | Sheynblat |
| 2009/0177384 | A1 | 7/2009 | Walder |
| 2010/0279706 | A1 | 11/2010 | Dicke |
| 2010/0305842 | A1 | 12/2010 | Feng |
| 2010/0318293 | A1* | 12/2010 | Brush ............... G01C 21/1656 |
| | | | 701/431 |
| 2011/0238289 | A1 | 9/2011 | Lehmann et al. |
| 2012/0158283 | A1 | 6/2012 | Arastafar |
| 2012/0284769 | A1 | 11/2012 | Dixon et al. |
| 2013/0099977 | A1 | 4/2013 | Sheshadri et al. |
| 2013/0178233 | A1 | 7/2013 | McCoy et al. |
| 2014/0045521 | A1 | 2/2014 | Grainger et al. |
| 2014/0155099 | A1* | 6/2014 | Cho ........................ H04W 4/02 |
| | | | 455/456.3 |
| 2014/0213294 | A1* | 7/2014 | Marti .................... H04W 4/021 |
| | | | 455/456.2 |
| 2015/0323341 | A1 | 11/2015 | Farrell et al. |
| 2015/0365803 | A1 | 12/2015 | Berger et al. |
| 2016/0050531 | A1* | 2/2016 | Choi .................... H04W 4/023 |
| | | | 455/456.2 |
| 2017/0086022 | A1* | 3/2017 | Beattie, Jr. ............. H04W 8/08 |
| 2017/0153118 | A1 | 6/2017 | Gum |
| 2018/0014161 | A1* | 1/2018 | Warren ............ G06F 16/24578 |
| 2018/0270620 | A1* | 9/2018 | Tolman ................. H04W 4/026 |
| 2020/0272221 | A1 | 8/2020 | Foster et al. |
| 2020/0404448 | A1 | 12/2020 | Park et al. |
| 2021/0080260 | A1 | 3/2021 | Tremblay et al. |

FOREIGN PATENT DOCUMENTS

| | | |
|---|---|---|
| EP | 3402227 A1 | 11/2018 |
| EP | 3940620 A1 | 1/2022 |
| JP | 2004184338 A | 7/2004 |
| JP | 2006166421 A | 6/2006 |
| JP | 2010025846 A | 2/2010 |
| JP | 2017000353 A | 1/2017 |
| JP | 2017224301 A | 12/2017 |
| JP | 2021120680 A | 8/2021 |
| WO | 2012031255 A2 | 3/2012 |
| WO | 2013059618 A1 | 4/2013 |

OTHER PUBLICATIONS

International Application No. PCT/US2023/018726 , International Search Report and Written Opinion, Mailed On Aug. 24, 2023, 11 pages.

Ludford, Pamela, J., et al., "Because I Carry My Cell Phone Anyway: Functional Location-Based Reminder Applications," CHI 2006 Proceedings, Apr. 22-27, 2006, Montreal, Quebec, Canada, pp. 889-898.

Road-Ninja: Up-Close Mobile App Inspection, Kicking Tires, [online] [retrieved Mar. 12, 2012], 4 pages., retrieved from the Internet <URL: http://blogs.cars.com/kickingtires/2012/02/mobile-app-snapshot-road-n inj . . . >.

First Examination Report issued in Australia Application No. AU2023268970, dated Sep. 2, 2025 in 4 pages.

International Preliminary Report on Patentability issued in PCT Application No. PCT/US2023/018726, dated Nov. 21, 2024 in 9 pages.

Office Action issued in Japan Application issued in JP2024564516, dated Nov. 17, 2025 in 11 pages.

Australian Patent Application No. AU2023268970 , "Second Examination Report", Mar. 21, 2026, 3 pages.

* cited by examiner

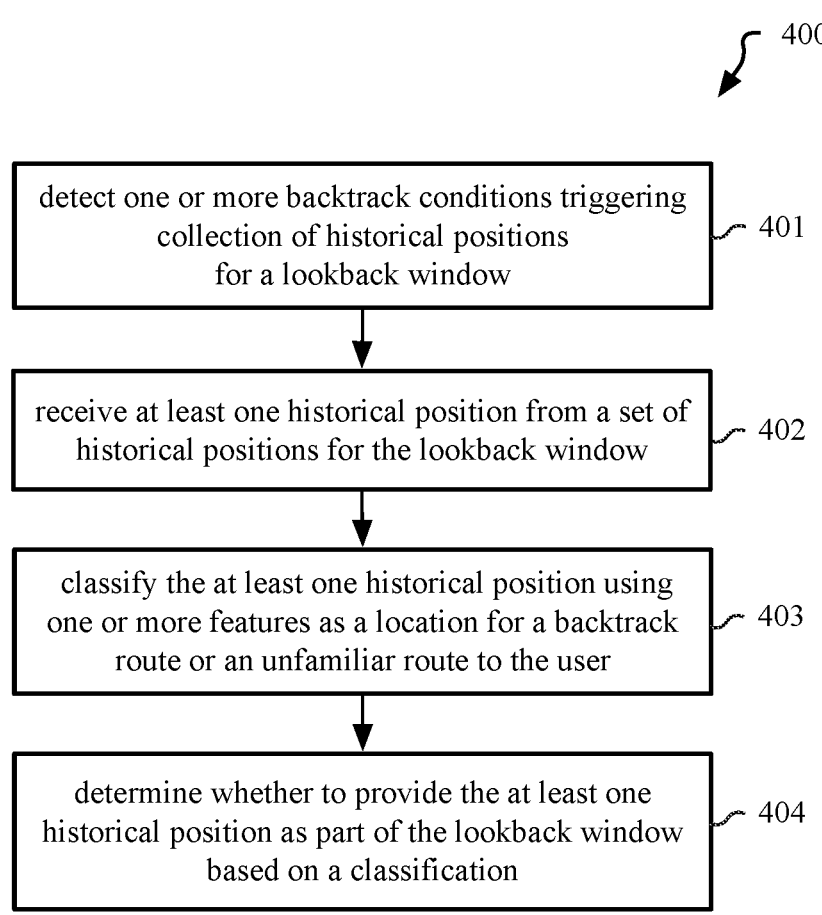

400 detect one or more backtrack conditions triggering
collection of historical positions
for a lookback window                                          401 receive at least one historical position from a set of
historical positions for the lookback window                  402 classify the at least one historical position using
one or more features as a location for a backtrack
route or an unfamiliar route to the user                      403 determine whether to provide the at least one
historical position as part of the lookback window
based on a classification                                     404

*FIG. 4*

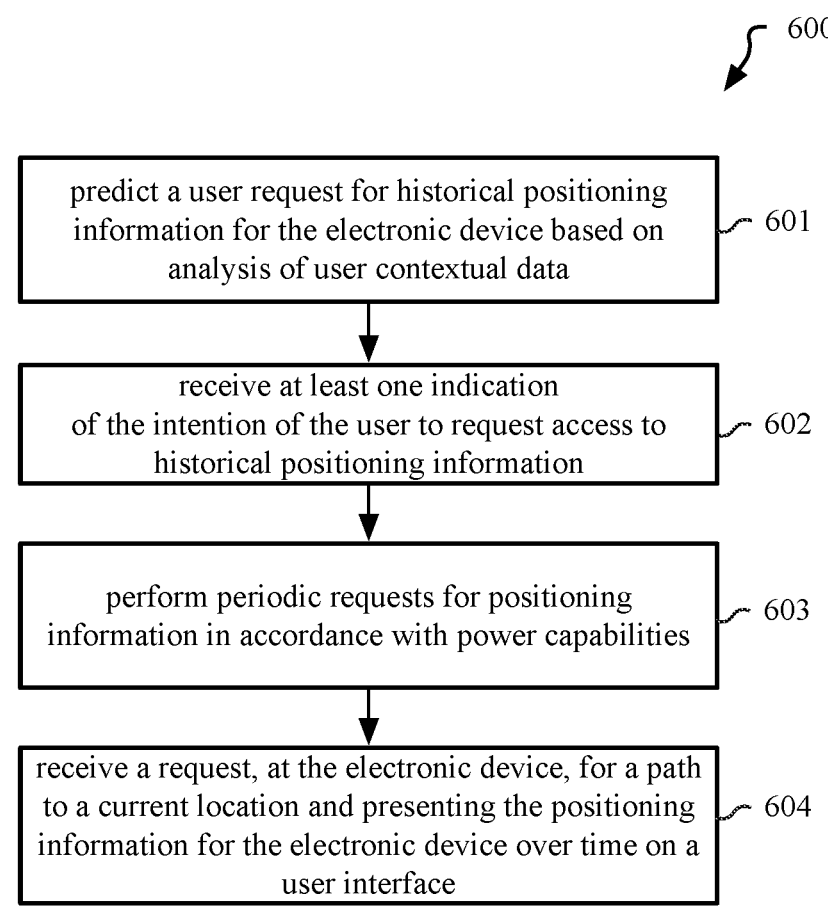

600 predict a user request for historical positioning information for the electronic device based on analysis of user contextual data — 601 receive at least one indication of the intention of the user to request access to historical positioning information — 602 perform periodic requests for positioning information in accordance with power capabilities — 603 receive a request, at the electronic device, for a path to a current location and presenting the positioning information for the electronic device over time on a user interface — 604

*FIG. 6*

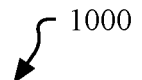
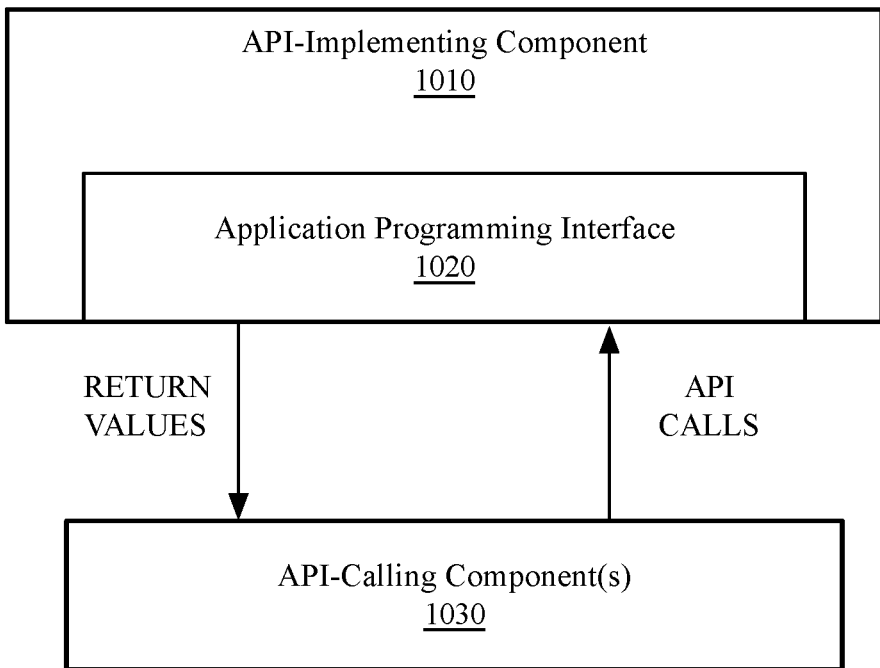
*FIG. 10*

PROACTIVE RECORDING OF LOCATIONS FOR BACKTRACKING

RELATED APPLICATIONS

This application claims the benefit of priority of U.S. Provisional Application No. 63/339,863, filed May 9, 2022, entitled "Proactive Recording of Locations for Backtracking," which is herein incorporated by reference.

FIELD

Embodiments described herein relate to provision of location services.

BACKGROUND INFORMATION

Hikers, pedestrians, and cyclists, typically, do not plan on getting lost, and as a result, prior route information may not be readily available on a user's device when a user needs the prior route information and/or network access is unavailable such that positioning information cannot be obtained. Even if a user has access to map data, the user may not know where they are located relative to a trail in the map data during a hike, if they have ventured off the trail. As such, techniques to assist user's in finding their way back to a familiar location or providing a way for emergency services to locate a user are needed.

BRIEF DESCRIPTION OF THE DRAWINGS

FIG. 4 is a flow chart illustrating a location services approach according to an embodiment.

FIG. 6 is a flow chart for location services in accordance with an embodiment.

FIG. 10 is a block diagram illustrating an exemplary API architecture, which may be used in some embodiments.

SUMMARY

Figure 1:
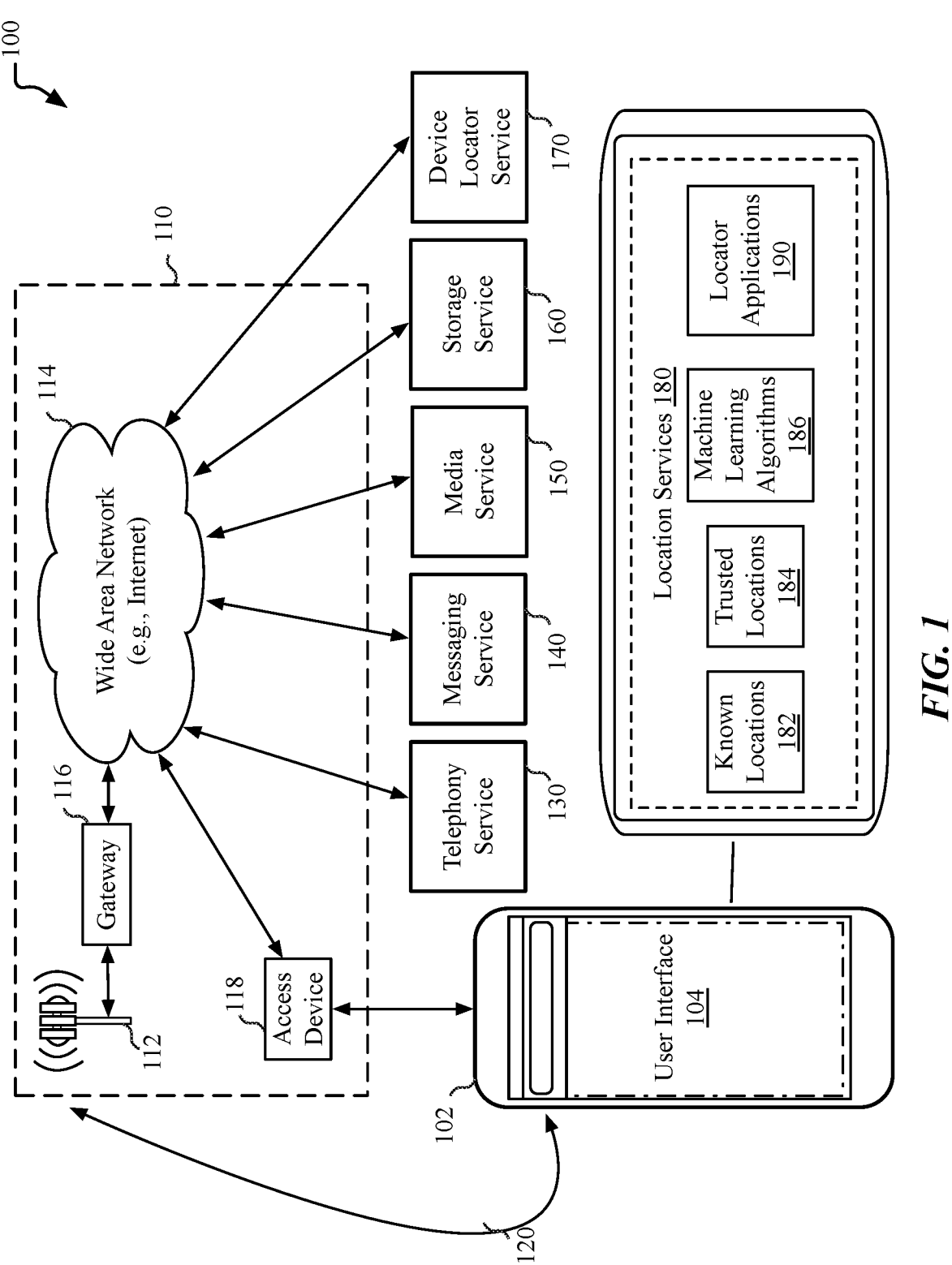
FIG. 1 is a block diagram of a network operating environment for mobile devices, according to an embodiment.

Methods, non-transitory machine-readable mediums, and system to provide historical positioning information are described. In an embodiment, a device detects one or more conditions in user contextual data that trigger collection of a set of historical positions for a lookback window, the device receives at least one historical position from the set of historical positions for the lookback window, the device classifies the at least one historical position based on one or more features as a candidate location for a backtrack route, and the device determines to provide the at least one historical position as part of the lookback window based on the classification. In an embodiment, the one or more conditions are at least one of an in transit motion classification, a threshold period of time without network access, a sparse environment classification, or a threshold distance from a frequented location. In another embodiment, the device receives a request for the lookback window from an application, in response to the request, classifies historical positions in the set of historical positions in the lookback window from a last classified historical position in the set to locate a most recent candidate historical position to begin a backtrack route, and truncates historical positions in the set of historical positions prior to the most recent candidate position. In an embodiment, the device deletes the truncated historical positions from the electronic device. In another embodiment, the application has an entitlement to request the lookback window. Embodiments may provide a device analyzes user context data to determine a set of conditions are met for proactively obtaining positioning data in an extended mode, where the extended mode includes duty cycling position information requests to obtain intermittent position fixes. In an embodiment, the one or more features include a duration of time for the lookback window, a distance from a frequented or trusted location, a timing for obtaining the historical positioning information prior to and after entry of a motorized-vehicle or electric-vehicle, a density of structures classification, an access point density, a motion classification, a mode of transport classification, or a user activity.

DETAILED DESCRIPTION

Embodiments provided herein describe obtaining positioning information from a global navigation satellite system (GNSS), such as a global positioning system (GPS), when one or more backtracking conditions are met. One or more backtracking conditions are a set of conditions that allow for an inference that a user is on a route that is unfamiliar, in the wilderness, part of an exercise session, unable to recharge their device for an extended period of time, and/or engaging in any other activity that may require retracing the steps taken on the route. Based on the set of backtracking conditions that are observed, a prediction is made that a user may need historical positioning information to be able to retrace their steps with the backtrack route and request the electronic device proactively obtain the historical positioning information. The backtrack route may be the set of historical positions obtained over a lookback window of time that allows the user to retrace their steps. The lookback window is the set of historical positions over an immediate period of time that are likely to be needed in order to retrace their steps while preserving the privacy of the user from a bad actor seeking more than the recent backtrack route. In some embodiments, the lookback window of positions returned upon request is adjusted (e.g., truncated, pruned, etc.) to provide positioning information only pertinent to the immediate need for the backtrack route.

Embodiments described herein provide a backtrack classifier that classifies obtained historical positions upon request for the electronic device as a candidate position or not a candidate position in the backtrack route for a user of the electronic device. In an embodiment, historical positions are classified to find the most recent historical position from which the backtrack route may be needed. The historical positions designated as part of the backtrack route may be provided to a location services application upon request to aid the user in retracing their steps, potentially when lost and/or request aid in an emergency situation.

Because non-stop or continuous collection of positioning information may drain resources (e.g., battery, processor usage, etc.) when a user is unable to recharge their device (such as while in the wilderness or lost), the electronic device may obtain position information in a power conserving extended mode when one or more backtrack conditions are met. The mode change may be a de-escalation from higher power state with more precise location monitoring (e.g., non-extended mode) to a low power state with coarse location monitoring (e.g., extended mode) to extend the life of the battery. Some embodiments provided herein describe power saving modes for devices capable of receiving information from a global navigation satellite system (GNSS), such as a global positioning system (GPS), to execute a location services application. The location services application may request positioning information (e.g., GPS data) repeatedly over a period of time to provide a trajectory of travel for the device and/or a distance that the device has traveled over the period of time. In some embodiments, an extended power saving mode (extended mode) approach is described to extend a battery life of the device (e.g., smart watch, step tracking devices, location service devices, etc.) while executing the location services application and/or collecting positioning information for the location services application during an extended period of time when a user may not be able to recharge their device. The battery life is a length of time that the device can continue to execute instructions before the device battery needs to be recharged. For example, a location services application that receives a request to record locations of the device for a user on a hike, a run, participating in a marathon, on a camping trip, and/or any other activity may need to record positioning information using GNSS over an extended period of time without access to a method for recharging the battery and may need to alter functionality of the device to extend the life of the battery. In another example, positioning information may be collected to be able to provide location information if the user is lost or in an emergency situation and requires location information be accessible for the user and/or a provider of aid to the user after the extended period of time that the user is unable to recharge the device. In a non-extended mode, positioning information is obtained continuously at defined intervals of time (e.g., every second) that may drain the battery if positioning information is collected over a period of time that exceeds the battery life for the device available before it is necessary to recharge the device.

In an embodiment, an extended mode provides duty cycling GNSS requests for positioning information. Duty cycling is the fraction of a defined period of time in which a system is active. In extended mode, collection of positioning information may be requested every N minute period with intermittently received position fixes. Intermittently received position fixes may be requested and received at any time within the period such that the position fixes are received at irregular intervals of time. For example, the intermittently received position fixes are received at varying times within the N minute period and/or the position fixes are continuously requested and received for varying durations of time during the duty cycling period. The intermittent receipt of position fixes allows the application processor (AP) and/or a radio processor (e.g., GPS processor) to sleep in between requests and/or to handle requests by other applications. Some embodiments may turn off all other functionality of the device in extended mode to allow for collection of positioning information, health information, location services applications, and/or any other limited set of applications.

In some embodiments, user context (e.g., set of conditions) may determine which mode (e.g., extended mode, non-extended mode) with corresponding positioning techniques and resources of the electronic device that are used to obtain positioning information. User data may be analyzed to determine if the user context exists to trigger a change in a corresponding mode for determining positioning information executing on the electronic device. Alternatively, extended mode may be explicitly selected by the user via a user interface of the device.

FIG. 1 is a block diagram of a network operating environment 100 for mobile devices, according to an embodiment. The network operating environment 100 includes electronic devices, such as mobile device 102. Mobile device 102 can be any electronic device capable of communicating over a wireless network and/or a wireless accessory device. Some examples of mobile devices 102 include, but are not limited to, the following: a smartphone, a tablet computer, a notebook computer, a wearable device (e.g., smartwatch or other wearable computing accessory), a mobile media player, a personal digital assistant, AirPods®, EarPods®, PowerBeats®, AirTag®, locator tags, headphones, head mounted display, health equipment, speakers, and other similar devices. In an embodiment, an accessory device may be paired with mobile device 102. By way of example, accessory devices may be devices such as Apple AirPods®, EarPods®, PowerBeats®, exercise equipment, vehicles, bicycles, scooters, smart televisions, Homepods, automated assistant devices, home security systems, and/or any other mobile accessory device.

Each of mobile devices 102 optionally can include a user interface, such as user interface 104 of mobile device 102. In other embodiments, a mobile device, may not have a user interface. Mobile devices 102 may be a third-party device that utilizes an application programming interface to access device locator services. The third-party device may be provided by a different device manufacturer or be part of a different ecosystem (e.g., operating system) from mobile device 102. Mobile device 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112 (as shown with 120), gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 102 can be physically connected to the access device 118 using one or more cables, for example, where the access device 118 is a personal computer. In this configuration, mobile device 102 can be referred to as a "tethered" device. In one embodiment, mobile device 102 can communicate with accessory devices via a wireless peer-to-peer connection. The wireless peer-to-peer connection (not shown) can be used to synchronize data between the devices.

Mobile device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102.

Mobile device 102 may have applications, services, and functionality locally accessible on the devices including location services 180. Mobile devices 102 may offer one or more device locator applications 190 (e.g., a "Find my" application, a "Compass" application, a mapping application, etc.) to utilize device locator services 170 and location services 180 to locate accessory devices, provide a mapping application, and a navigation application. The navigation application (e.g., a "Compass" application) to aid the user in navigating and backtracking to historical positions on their route. The navigation application is an application that shows the cardinal directions used for navigation and geographic orientation using any number of methods including gyroscopes, magnetometers and/or positioning systems (e.g., GPS receivers). The mapping application is an application that uses maps delivered by a geographic information system (GIS).

Locally accessible data may be stored on defined locations, such as known locations 182 and safe, trusted locations 184. Machine learning algorithms 186 may be used to classify locations, infer relationships between a user and locations, provide path reconstruction and/or distance estimates in embodiments. In some embodiments, machine learning algorithms 186 may be used to provide an estimate for a distance with a set of features, including, but not limited to, intermittently received position fixes for a path and a straightness metric for a set of position fixes.

In some instances, machine learning algorithms 186 may be used to identify known locations 182, and/or trusted locations 184. By way of example, cluster data analysis may be used to identify, classify, and provide semantic labels for locations, such as locations frequented by a user. Safe, trusted locations 184 may be designated explicitly or confirmed as such by a user of the mobile device 102 after data analysis. In other instances, the known locations 182 or the trusted locations 184 may be classified offline and provided by device locator service 170 or a third-party (e.g., a database with map information). Although cluster analysis is provided as an example of machine learning algorithms that may be used, those with skill in the art will recognize that other algorithms may be used to identify potential known or trusted locations.

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with mobile device (e.g., accessory devices, and mobile device 102) and/or any other location designated as a trusted location 184 by the user. Known locations 182 may be business locations, public spaces, parks, museums, and/or any other location that may be frequented by a user.

Defined locations may have associated fence information that provides a set of conditions, if detected, allow for designating or classifying an electronic device relative to a region of physical space for at least a portion of the defined location. For example, fence information may provide the conditions for classifying the electronic device as either inside or outside a region of physical space associated with the defined location. In another example, fence information may provide the conditions for classifying the electronic device as transitioning between inside or outside the region of the defined location. Fence information may be a geofence with boundary information for the defined location, such as a point location and the extents of the region from the point location (e.g., a circular region defined with a radius from the point location, a polygon shape with distance measurements from the point location, etc.). Fence information may include a set of sensor measurements received by electronic devices (e.g., fingerprint data including radio frequency (RF) scan data, such as Wi-Fi scan traces, etc.) that are characteristic of a particular region of the defined location. Fence information for the respective defined locations may be stored along with classification type for the location and any semantic label assigned to the location. Boundary information may include a defined set of boundaries or a radius distance around a point location to allow for creation of a fence for the location. In some embodiments, the fence is a virtual perimeter for a real-world geographic area. Global positioning system (GPS) may be used to create a virtual fence around a location and track the physical location of the mobile device 102 within the geofence boundary as well as entry and exit of the bounded area. In some embodiments, there are at least two tiers of fences that may be used to reduce traditional geofence latency. For example, the mode selected based on analysis of user contextual data to determine intent may factor into selection of the granularity of the fence established. In some embodiments, multiple fences may be used to refine positioning information determined by a coarse-grained geofence.

Machine learning algorithms 186 may include on-device heuristics, machine learning algorithms, or a combination thereof to analyze and assign a label regarding a user context, such as a location status. The location status may be a label for a user context (e.g., set of conditions, a motion classification) in which specific positioning techniques and resources of the electronic device are used to obtain positioning information. The location status may define a current location state and/or a prediction of a change in location state of a user while traveling with the electronic device. By proactively obtaining positioning information using techniques appropriate for the location status, latency is reduced in provision of the information for device applications without incurring a noticeable decline in performance of the electronic device that may be experienced with constant requests for positioning information. For example, the user context may indicate movement or travel of an electronic device to allow the electronic device to be designated as having a motion classification, such as "in transit", "settled" in a particular defined location for a time period, or any other defined motion classification. Analysis may be performed using a variety of signals from contextual user data sources available to the mobile device 102, including, but not limited to, the following: sensor data, positioning data, calendar data, transit card usage data, application data, historical data on patterns/routines of travel, wireless connection status with accessory devices and/or services (e.g., Bluetooth connection status), device location history, and/or any other data accessible to the mobile device 102. In an embodiment, the wireless connection status with various devices may indicate that the device is settled or "in transit." For example, a loss of a connection to an appliance, a security system, a heating/cooling systems, vehicles, other modes of transport, and/or any other devices may indicate that the mobile device is "in transit".

In some embodiments, a mobile device 102 may be classified with a "settled" semantic label after remaining within the geographic boundaries that define a location (e.g., the trusted location 184) for a defined time period. In an example, received positioning data for the mobile device 102 may indicate the electronic device 102 remained within the boundaries of a fence for a particular location for a duration of time (e.g., 5 minutes). Sensor data, such as accelerometer data, may indicate that the mobile device 102 is at rest to support an inference of being settled. Application data may support the inference that the mobile device 102 is settled, such as the mobile device being located at a calendar appointment location. Application data indicating a type of application in use may also provide an inference of the device being settled, such as using a media application. Historical data for the user on routines or patterns in travel may be used to determine whether the mobile device 102 is settled, such as a bedtime routine at a home or a hotel location.

Mobile device 102 may be classified as with an "in transit" label based on prior detected behavior, patterns, or routines for the user, and analyzed on mobile device 102. For example, the user may have routine of going to work around the same time every day and an "in transit" state may be assigned if the data on the device supports that the pattern is being repeated. A speed at which the mobile device is moving or entering and exiting known geographic areas (e.g., using fences) may allow for the inferring that the mobile device 102 is in transit. If the mobile device 102 is detected as accelerating in known areas of transit (e.g., on roads, highways, train routes, etc.), then the mobile device 102 may be given the motion classification of "in transit." Similarly, if transit applications/cards are used/in use, then the mobile device 102 may be designated as "in transit".

Mobile device 102 may be classified as a "threshold distance," "near an entry," "near an exit," "entry" and/or "exit" of a set of locations or a particular location based on crossing fence boundaries for the respective location or set of locations and/or detecting a pattern of sensor values that are characteristic of being in a location, such as Wi-Fi scan results characteristic of being inside a location or transitioning into a location.

Figure 2:
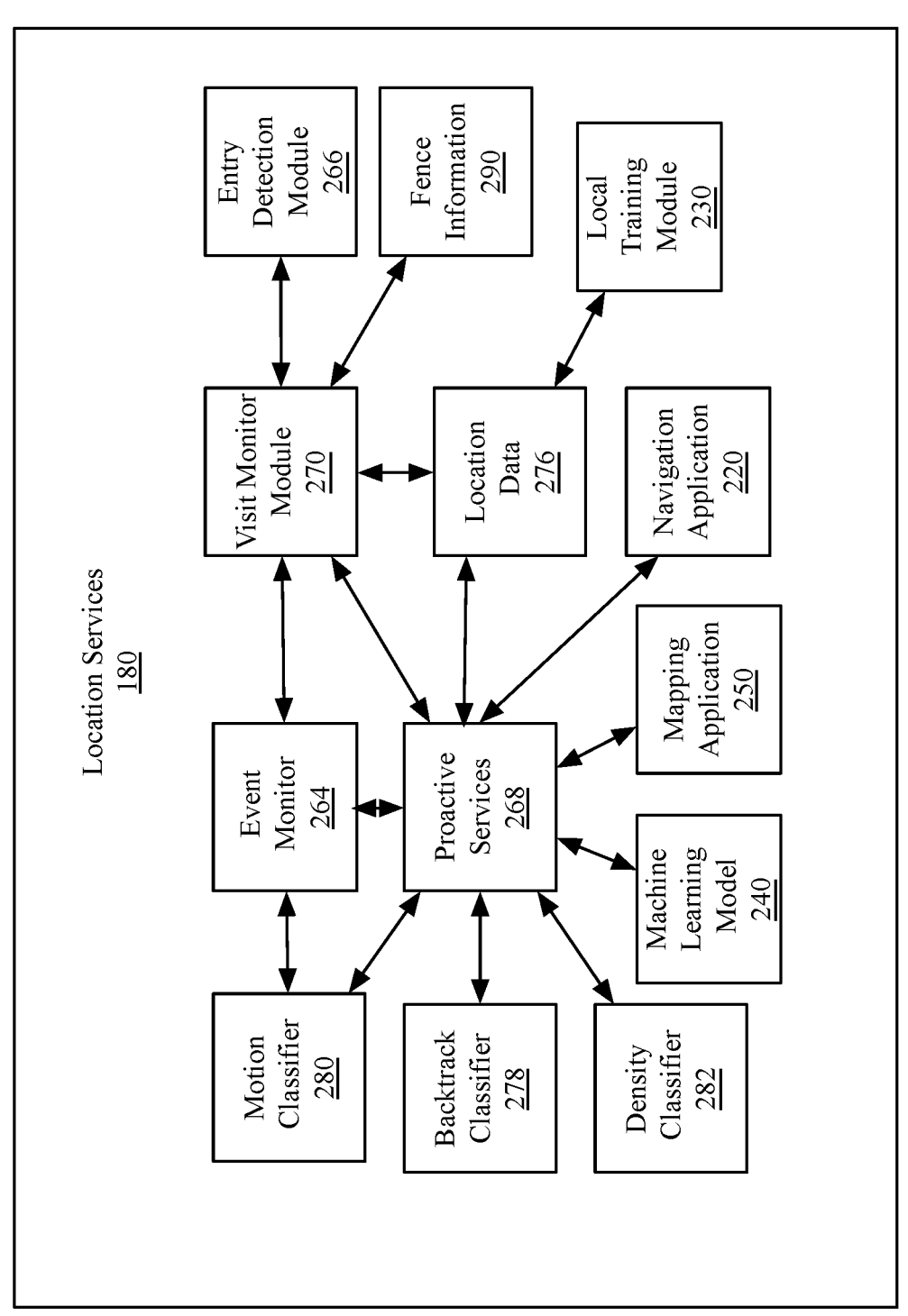
FIG. 2 is a block diagram for location services according to an embodiment.

FIG. 2 is a block diagram for location services according to an embodiment. Location services 180 may include an event monitor module 264 (e.g., a fence event monitor, location status monitor, sensor monitor, etc.) that may aid in determining when power and performance modes should be adjusted for determining positioning information. Event monitor module 264 may rely on data from contextual user data sources to serve as cues for user context and event monitor module 264 may use heuristics and/or machine learning algorithms 186 to determine user contexts that trigger adjustment of modes. Event monitor module 264 may detect whether a user is entering a defined location and a location that is unfamiliar to the user. For example, mobile device 102 may be designated with an "in transit" state using a motion classifier 280 and wireless connection status data may indicate that a Bluetooth connection is lost between the mobile device 102 and an accessory device, such as a vehicle entertainment system. Continuing with the example, the events monitor module 264 may determine from one or more contextual user data sources that there is at least one indication that there will be a change in location status and/or motion classification of the mobile device 102, such as the mobile device 102 may be "in transit to a defined location." User contextual data, such as crossing fence boundaries, exiting a vehicle, exiting a transit station, user routines, sensor data, application data, etc., may be analyzed to predict that the electronic device is a threshold distance from a defined location and that the mode for electronic device should be adjusted.

In an embodiment, event monitor 264 may detect from user contextual data that the user is in a remote location (e.g., wilderness), on an unfamiliar route, and/or unlikely to charge their device for an extended period of time. For example, a variety of signals from user contextual data may indicate that the user will be unlikely to charge their device, such as application data indicating a user tracking a workout, a maps application with a hiking path selected for display, a loss of cellular service, and/or any other data accessible on the device that provides context for activities of a user that may allow for the inference that the user will not be able to recharge the electronic device 102. In another example, the user may select a mode that indicates the user will not be able to recharge the electronic device 102.

The visit monitor module 270 may utilize event monitor 264, fence information 290, and entry detection module 266 to accurately detect entry to a defined location and reduce latency for provision of positioning information by predicting the user will request the positioning data. The visit monitor module 270 may retrieve fence information 290 to define a more precise boundary for a defined location when the electronic device 102 is detected crossing a more coarse-grained geofence boundary, as detected using the entry detection module 266. In another embodiment, the visit monitor module 270 may retrieve expected sensor data (e.g., fingerprint data) characteristic of an electronic device 102 with the location status.

The proactive services 268 may be used to predict what applications and/or services that the user may want to access with a given user context, motion classification, and/or location status. For example, the user may want to access a particular application just prior to or upon entry to a location. Proactive services 268 may select applications based on user history of application selection or suggest a new application associated with a particular defined location.

In an embodiment, the electronic device 102 (with the event monitor 264) may detect a set of conditions that allow for an inference that user may request a backtrack route to allow for retracing their steps and the electronic device 102 may initiate an extended mode to obtain the positioning information so as not to affect the performance of the electronic device 102. In an embodiment, proactive service 268 may adjust a rate for periodic requests for determining positioning information. To handle intermittent receipt of positioning information, a machine learning model 240 may be used to reconstruct a path from user accessible data and estimate a distance for the path taken by the user.

In some embodiments, map data accessed by a mapping application 250 is used to estimate distances. The mapping application is an application that uses maps delivered by a geographic information system (GIS). The navigation application 220 may provide heading or direction (e.g., degrees from magnetic north) information for the mobile device 102 that is collected as the user is traveling, and the heading data is averaged to eliminate errors in heading information collected due to variations in heading measurements collected due to movement of the device (e.g., jostling of device, swinging of hand if device worn on wrist of user, etc.) as the user travels along their trajectory.

Proactive services 268 and event monitor 264 may use a motion classifier 280, density classifier 282, and a backtrack classifier 278. A motion classifier 280 that has been trained on a feature set from data obtained using electronic device sensors may provide information on whether electronic device 102 is stationary or in transit with a user. While embodiments are not limited to a specific sensor type, specific sensor data representations, or specific features, exemplary sensors, and features are described herein that are capable of distinguishing between specific movements within the sensor data. The motion classifier can analyze provided features from sensor data using one or more models that are trained to perform identification of motion type based on the supplied features. In some implementations, the electronic device can receive motion classification from the electronic device or from a server indicating that the mobile device is traveling in a particular mode of transport. The backtrack classifier 278 classifies obtained historical positions for the mobile device 102 as potentially part of a backtrack route for a user of the electronic device 102.

A density classifier 282 that has been trained on a feature set from data obtained using electronic device sensors may provide information on the density of structures and/or population for a given geographic area. Features considered when classifying the geographic area include, but are not limited to, the following: wireless access point density, radio frequency signal (e.g., Bluetooth, UWB, etc.) density information, and/or map data on density and landscape to provide information on whether electronic device 102 is in a dense or a sparse geographic area.

Figure 3:
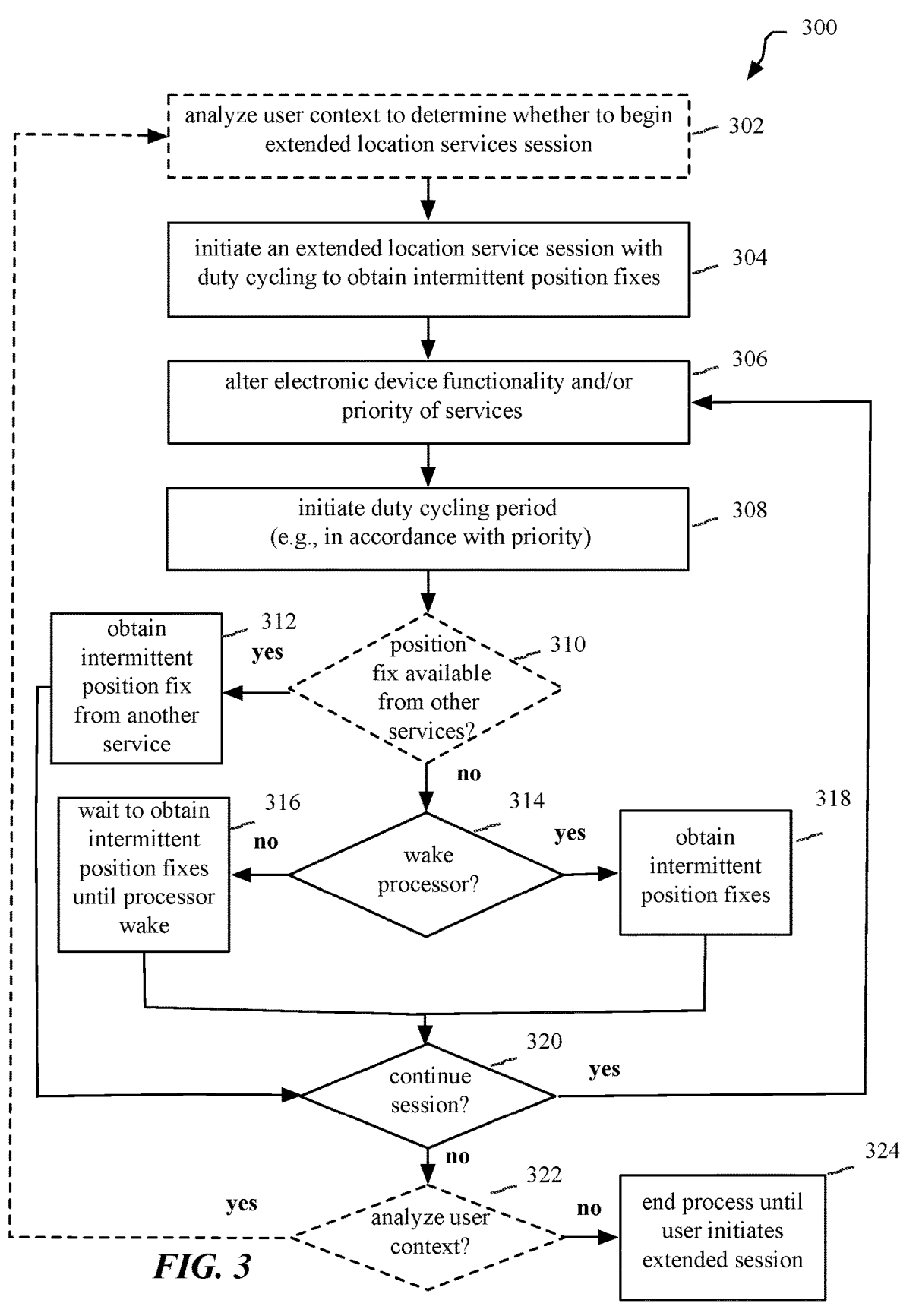
FIG. 3 is a flow chart illustrating an extended mode approach according to an embodiment.

In some embodiments, the electronic device 102 in FIGS. 3A-12 is a mobile device 102 as described with FIGS. 1-2. Rhythmic GNSS FIG. 3 is a flow chart 300 illustrating an extended mode approach according to an embodiment. Although a particular approach for obtaining historical positioning information is described, those with skill in the art will recognize that positioning information may be obtained in various manners and techniques described regarding the adjustment of the lookback window may be implemented with any set of positions to protect the privacy of the user. In some embodiments, a user explicitly selects an extended mode via a user interface on the electronic device 102. The mode change may be a de-escalation from higher power state with more precise location monitoring (e.g., non-extended mode) to a low power state with coarse location monitoring (e.g., extended mode) to extend the life of the battery. Alternatively, or additionally, the electronic device 102 may rely on user contextual data to determine selection of a mode that causes either escalation or de-escalation of power usage including duty cycling of requests for positioning information in some embodiments. User contextual data is analyzed to determine whether to begin an extended location services session in the extended mode (302). The electronic device 102 analyzes user context data to determine a set of conditions are met for proactively obtaining positioning data in the extended mode. The set of conditions allow for an inference that a user is on a route that is unfamiliar and/or in the wilderness and a prediction that a user may need to be able to retrace their steps with a backtrack route and proactively obtain the historical positioning information. A variety of data sources may be analyzed to determine user context, including, but not limited to, the following: sensor data, application data, frequented locations, trusted location, known user routines, known locations of interest, detection of entry and/or exit of a vehicle (e.g., loss of Bluetooth connection to vehicle). In an embodiment, the electronic device 102 selects a mode based on conditions met in user contextual data, such as time or events, that indicate time intervals for capturing positioning information. For example, if a user is in transit for a long period of time or cell service is limited (e.g., weak, intermittent access, etc.) potentially indicating a user is on a hike, then positioning information may proactively be captured to allow a user to retrace their steps.

In an embodiment, the one or more backtrack conditions may include, but are not limited to, the following: in transit (e.g., not stationary) motion classification, threshold period of time without network access, sparse (e.g., not densely populated or density of manmade structures in the area, etc.) environment classification, and threshold distance from a frequented location and/or location that is part of a user routine. While specific categories of conditions are provided, those with skill in the art will recognize that any other user contextual data may supplement and/or form the basis of an inference that the user will request historical positioning information for backtracking.

Electronic device 102 initiates an extended location services session in the extended mode to perform duty cycling of requests for positioning information (e.g., GNSS requests) to obtain intermittent position fixes and extend the battery life (304). Electronic device 102 requests for positioning information may be intermittent to allow the AP to sleep in between requests and/or to handle requests by other applications. By way of further example, electronic device 102 may collect positioning information every N minutes (e.g., every 2 minutes) and the duration of time for obtaining a position fix using GNSS may vary each time. Continuing with the example, electronic device 102 may request positioning information every two minutes and the duration of time that the request for positioning information is serviced may depend on operating conditions of the device.

Optionally, the functionality offered by the electronic device 102 may be altered (306). In some embodiments, functionality of applications and services (e.g., 130-180), sensors, processor usage, other hardware, and/or network access may be reduced. Services and applications accessible on the electronic device 102 may be assigned a priority and the provision of services and applications on the electronic device 102 may execute in accordance with the assigned priority (308), including initiating the duty cycling period. The electronic device 102 initiates the duty cycling period (308) in accordance with the priority assigned to obtaining positioning information. If a position fix is available from other services (310), then the position fix may be obtained from the other service (312). Alternatively, the electronic device determines whether to wake the processor (e.g., AP or radio processor) in accordance with the priority assigned to obtaining positioning information (314). In some embodiments, the mode may determine a particular processor type for determining positioning information, such as whether positioning information requests are executed on an AP, a radio controller, or a low power "always on" processor (AOP), or whether the device executes requests on the AP, the radio controller, or the AOP intermittently with irregular time intervals to preserve the device battery.

The electronic device 102 may collect positioning information opportunistically when the AP is already executing instructions (e.g., for another application) (316). For example, if obtaining health information for the user, communication services, etc. is prioritized over obtaining positioning information, then obtaining positioning information may be performed in the background when the priority application is idle. Alternatively, the electronic device 102 may request to wake the AP for positioning information requests (318). The extended locations services session may continue (320) and optionally, alter functionality of services and applications (306). User context may continue to be analyzed in some embodiments (322) and (302). Alternatively, the process may end until the user initiates an extended location services session (324).

FIG. 4 is a flow chart 400 illustrating a backtracking approach according to an embodiment. The electronic device 102 detects one or more backtrack conditions that trigger collection of a set of historical positions for a lookback window of time (401). The one or more backtrack conditions are the set of conditions determined by analyzing user contextual data that allow for an inference that the user may need backtracking historical positioning data (e.g., is in the wilderness and/or in an unfamiliar area). The electronic device 102 predicts based on the one or more backtrack conditions that a user may want the historical position information to allow for backtracking (e.g., retracing route) in the navigation application and/or mapping application. In some embodiments, the one or more backtrack conditions detected are a subset of conditions that may be determined from analysis of accessible user contextual data as indicated in FIG. 3 with the extended mode. Although a particular approach is described for collection of historical positions, the set of conditions for inferring that a user is lost prior to collection of historical positions and the subsequent review of conditions before responding to a request for historical positions may be practiced with any implementation for collection of historical positions.

User contextual data may supplement the backtrack conditions to provide in a decision to initiate the extended mode and obtain positioning information. In an embodiment, the one or more backtrack conditions may include, but are not limited to, the following: in transit motion classification (e.g., not stationary), threshold period of time without network access, sparse environment classification (e.g., not densely populated or density of manmade structures in the area, etc.), and beyond a threshold distance from a frequented location and/or location that is part of a user routine. While specific categories of conditions are provided, those with skill in the art will recognize that any other user contextual data may supplement and/or form the basis of an inference that the user will request historical positioning information for backtracking.

The motion type classification condition is met if the electronic device 102 receives a motion classification of not stationary and/or is "in transit." In an embodiment, the motion type classification condition is met if the mode of transport is a human-powered (e.g., on foot, a bicycle, a skateboard, etc.) or motor-assisted vehicle (e.g., a motor-assisted bicycle) and not a motorized vehicle or automotive vehicle (e.g., car, airplane, electric vehicle). A motion classifier 280 that has been trained on a feature set from data obtained using electronic device sensors may provide information on whether electronic device 102 is stationary or in transit, including a mode of transport. In some embodiments, the motion classification may indicate an inference of the activity or mode of transport for the user while in transit, including, but not limited to, the following: walking, on a bicycle, on exercise equipment, on a scooter, on a skateboard, within a vehicle, on an airplane, on a transit vehicle, on a train, on a subway, human-powered vehicle, motor-assisted vehicle, electric-assisted vehicle, automotive vehicle, and/or any other motion classification.

The network access backtrack condition is met if the electronic device 102 is not in communication range to a wireless access point in a geographic area (e.g., internet access, WiFi, cellular network access points, etc.) or the geographic area has a relatively lower access point density as compared to a defined access point density threshold. The electronic device 120 can, for example, conduct one or more wireless surveys to probe the geographic area for the presence of wireless access points while the device is in transit for a span of time. For example, the electronic device 120 can continuously, periodically, or intermittently search for wireless signals transmitted using one or more frequency bands designated for wireless communications. If the observed number of access points is lower than the defined access point density threshold for the span of time, then the network access backtrack condition is met.

The electronic device 102 determines if the type of environment backtrack condition is met based on a classification for the geographic area as having a sparse density of structures in the geographic area using the density classifier 282. The density classifier 282 that has been trained on a feature set from data obtained using electronic device sensors may on wireless access point density, radio frequency signal (e.g., Bluetooth, UWB, etc.) density information, and map data on density and landscape to provide information on whether electronic device 102 is in a dense or a sparse geographic area. In some embodiments, the density of wireless access points in the region is a feature provided in the classification for the density of structures in the geographic area. For instance, if there are a large number of different wireless access points per area, then there is a higher likelihood of a dense urban environment. As another example, the time span recorded between observations of wireless access points may be a feature provided to the density classifier 282 and serve as an indicator for a sparse environment. In some embodiments, a map tile service can provide a tile-based mapping service to the electronic devices 102 that enables the electronic device 102 to retrieve map data and metadata for a geographic region of the electronic device 102 or a region that is being searched by the electronic device 102. The map tile metadata can be retrieved from a remote map tile database or a local (e.g., cached) subset of the map tile database. The metadata can include a classification of the current map tile or sub-tile.

The map tile metadata can also include digital elevation model (DEM) data that indicates a surface model including structures for the estimated geographic region and can be a feature for the density classifier 282.

Next, if the electronic device 102 is beyond a threshold distance from a frequented location, a location that is part of a user routine, a safe or trusted location, then the backtrack conditions met may be analyzed to determine if enough conditions are met to proceed with proactively obtaining historical positioning information.

If enough backtracking conditions are satisfied, then the electronic device 102 receives at least one historical position from a set of historical positions for the lookback period of time (402). Although described with reference to classification of a single historical position, those with skill in the art will recognize that a plurality of historical positions may be classified to determine the lookback window of historical positions to include in the backtrack route.

The electronic devices may classify the at least one historical position as a candidate position for a backtrack route based on one or more features (e.g., signals) observed at the time of collection for the historical position (e.g., duration of lookback window, no location further than 250 km, no locations before in vehicle, etc.) (403). Features considered when classifying the historical position include, but are not limited to, the following: duration of time included in lookback window, distance from a frequented, safe, and/or trusted location, position information collected prior to and after entry of a motorized-vehicle (e.g., automobile, airplane, etc.) and/or electric-vehicle, density of structures classification (e.g., urban area, etc.), access point density, motion classification, mode of transport classification, user activity (e.g., hiking event from calendar data), and/or any other feature that may indicate a user may need a backtrack route.

By way of example, the most recent historical position considered as a lookback window candidate may not as far back in the past as a max duration from a current time. Similarly, historical positions that are greater than a max distance from a current position may be excluded from consideration as a candidate for the lookback window. Position information acquired during a flight and/or other trip within a vehicle may be truncated from the lookback window and deemed not a candidate for the lookback window. In some embodiments, unless the user requests recording of historical positions near a frequented location and/or safe, trusted location, then the historical positions not beyond a trusted threshold distance may be truncated from the lookback window. An access point density and density of structures classification indication that the user may be in an urban location may allow for truncating the lookback window with associated positions. The features described are examples and any number of the described features may or may not be used by the backtrack classifier 278 to determine the lookback window.

The electronic device 102 determines whether to provide the at least one historical position as part of the lookback window based on a classification (404). In an embodiment, the classification of historical positions in the lookback window begins from a prior classified historical position in the lookback window and the classification continues until a most recent candidate is identified. The historical positions prior to the most recent classified candidate may be purged. By selectively providing historical locations when conditions suggest that the user is lost, bad actors are prevented from accessing and/or causing the exposure of prior locations for a user that may be against the user's own interest.

In some embodiments, the application requesting access to the lookback window must possess an entitlement. The entitlement may identify the application as having a right or a privileged to access positioning information. If the user requests via an application access to historical positioning information, then the lookback window positioning information may be provided opportunistically as opposed to requiring the user to request duplicate efforts to obtain historical positioning information.

Figure 5:
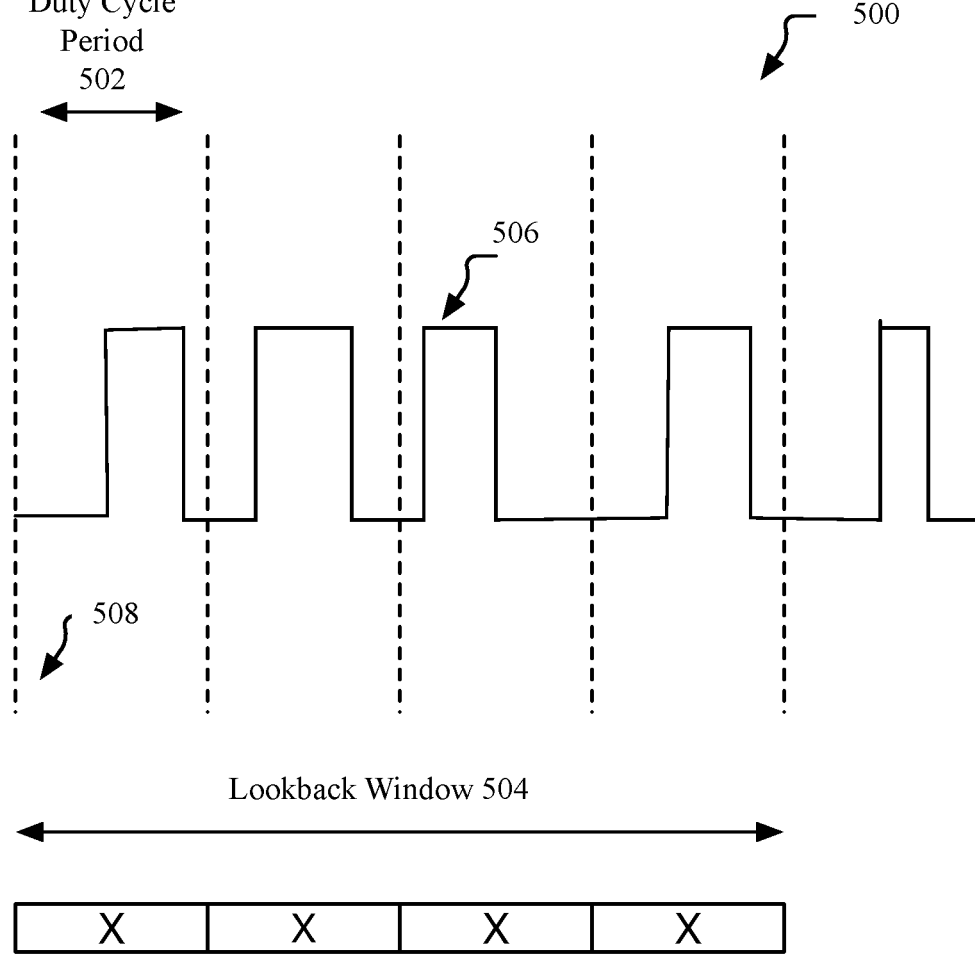
FIG. 5 illustrates a block diagram of a lookback window according to an embodiment.

FIG. 5 is a diagram 500 illustrating an extended mode approach according to an embodiment. After one or more conditions 508 are detected within user contextual data indicating the need to begin the extended mode, positioning information requests 506 are performed intermittently within a duty period cycle 502, as shown. A lookback window is a period of time 504, as illustrated, with a set of historical positions (as shown in FIG. 5 with "X" for each collected position) that are likely to be needed in order to allow a user to retrace their steps.

FIG. 6 is a flow chart 800 for location services in accordance with an embodiment. In some embodiments, location services may proactively obtain positioning information in anticipation of the user requesting access to the historical positioning information for use with an application, such as a map application. Contextual user data may be analyzed to predict that the user may request historical positioning information (801). For example, analysis of contextual user data may provide a prediction that positioning information for the most recent path or transit route taken may be requested by the user to allow the user to retrace their path. In some embodiments, contextual user data is analyzed to determine if the user is likely to get lost and/or not have access to positioning information due to loss of services (e.g., cellular or wi-fi services). In another example, historical routine data and/or application data (e.g., calendar data) may be analyzed to determine if the most recent positioning information for the user in transit is not part of the user's routine.

At least one indication of the intention of the user to request access to the historical positioning information may be received (802). The intention of the user to request such historical positioning data may be indicated by the electronic device 102 designated as in transit for a threshold duration and/or on a path with reduced access to services (e.g., cellular service, losing power). Certain activities or events indicated by contextual user data (e.g., application data) may serve as a predictor for needing access to historical positioning information and an intention to potentially request historical positioning information, such as sensor data or application data that indicates the user is exercising or walking. In another embodiment, analysis of user historical data may provide information on a routine transit route or path taken by the user, and the electronic device 102 may receive user contextual data that indicates the intention of the user to repeat the routine, such as exiting a vehicle at a parking lot near a recreational park, a hiking area, a ski area, and/or any other remote location.

Upon receiving an indication of the location status of a user intent to use an application that allows for retracing a path, periodic requests for positioning information in accordance with the power capabilities of the device may be performed (803). Coarse-grained geofences may be established where defined locations (e.g., ski chalets, national park offices, etc.) are found along the path to detect to obtain the positioning information of the user while in transit. In some embodiments, the AOP may be used to execute requests for positioning information (e.g., GPS). The positioning information over time may be presented upon request by the user at the electronic device 102 (804).

The user may be prompted to opt-in to allow the electronic device to proactively obtain positioning information when user contextual data indicates that the user may need to retrace their path, and the positioning information may be deleted when access to services, such as wireless connectivity or cellular service, have resumed.

Figure 7:
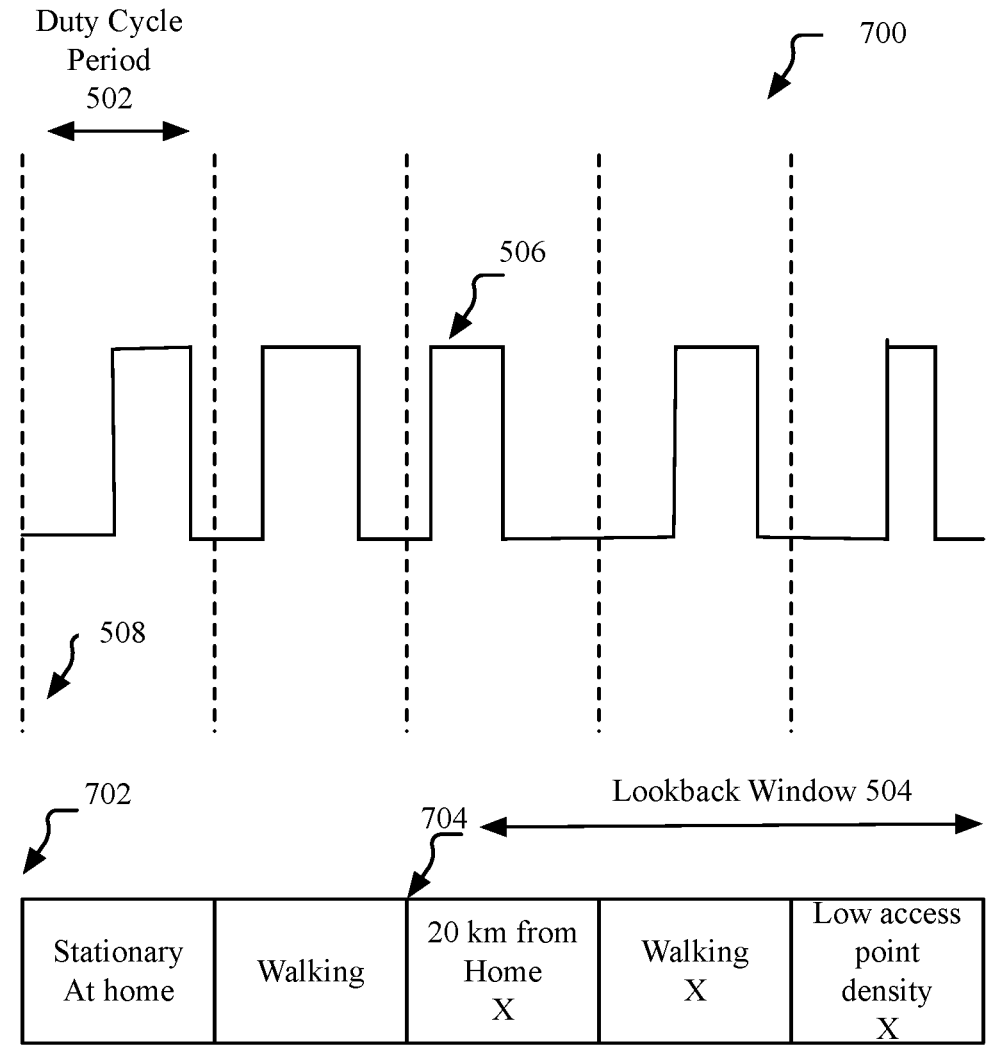
FIG. 7 illustrates a block diagram of a lookback window according to an embodiment.

FIG. 7 is a diagram 700 illustrating an extended mode approach according to an embodiment. After one or more conditions 508 are detected within user contextual data indicating the need to begin the extended mode, positioning information requests 506 are performed intermittently within a duty period cycle 502, as shown. A lookback window is a period of time 504, as illustrated, with a set of historical positions that are likely to be needed in a backtrack route to allow a user to retrace their steps. The max duration of time that a lookback window 504 may be defined (e.g., 4 days) is provided at 702. The backtrack classifier 278 classifies the historical positions prior to 704 as not candidates for the lookback window 504 because the user was stationary, at trusted location (home), and walked beyond a threshold distance from home. The historical position at 702 may have been the last processed historical position and the starting point for classification with the most recent request for a lookback window. The lookback window 504 was truncated and the positioning information 20 km, while the user was walking, and within a low access point density area is included in the backtrack route with the illustrated lookback window 504.

Figure 8:
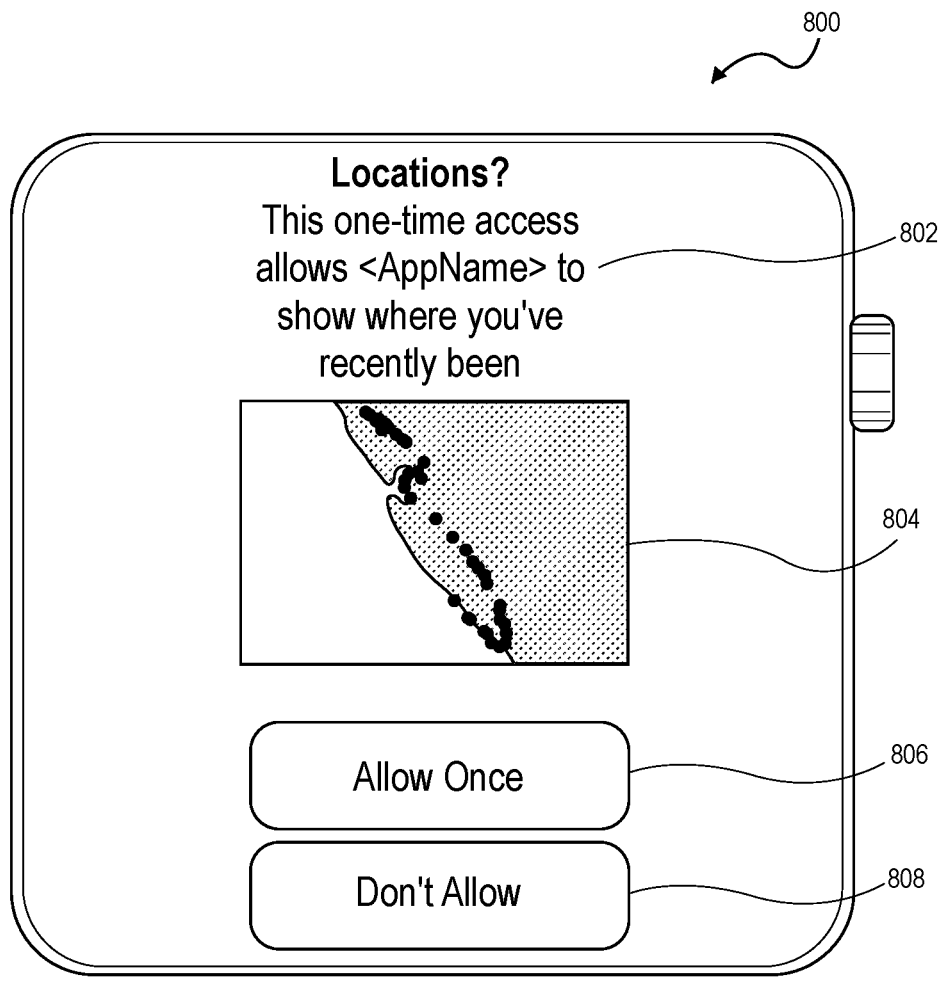
FIG. 8 depicts a user interface for location services in accordance with an embodiment.

FIG. 8 depicts a user interface 800 for location services in accordance with an embodiment. The user interface 104 of the electronic device 102 allows the user to select via user interface element 806 to share the lookback window of historical positioning information (as shown in 804) with the entitled "<App Name>" application 802 (e.g., possesses entitlement). Alternatively, the user may select to not allow access to the lookback window via user interface element 808.

Figure 9:
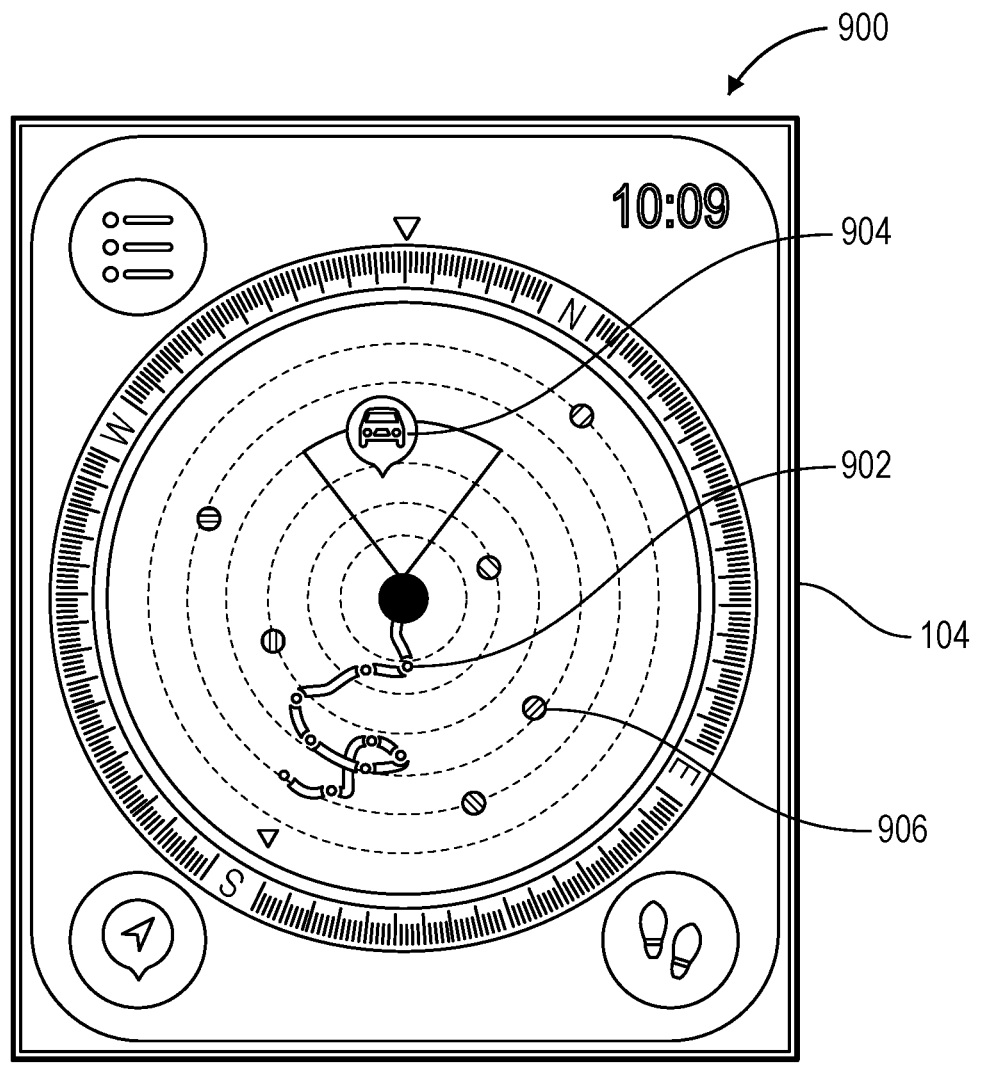
FIG. 9 depicts a user interface for location services in accordance with an embodiment.

FIG. 9 depicts a user interface 900 for location services in accordance with an embodiment. A compass location services application is depicted with an icon representing the location of a user's vehicle 904, waypoints 906 and a path 902 that a user has taken. The waypoint 906 and user vehicle 904 position may mark a place of special interest to the user and are depicted with as a relative position to a user's current location.

FIG. 10 is a block diagram illustrating an exemplary API architecture, which may be used in some embodiments of the invention. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 11:
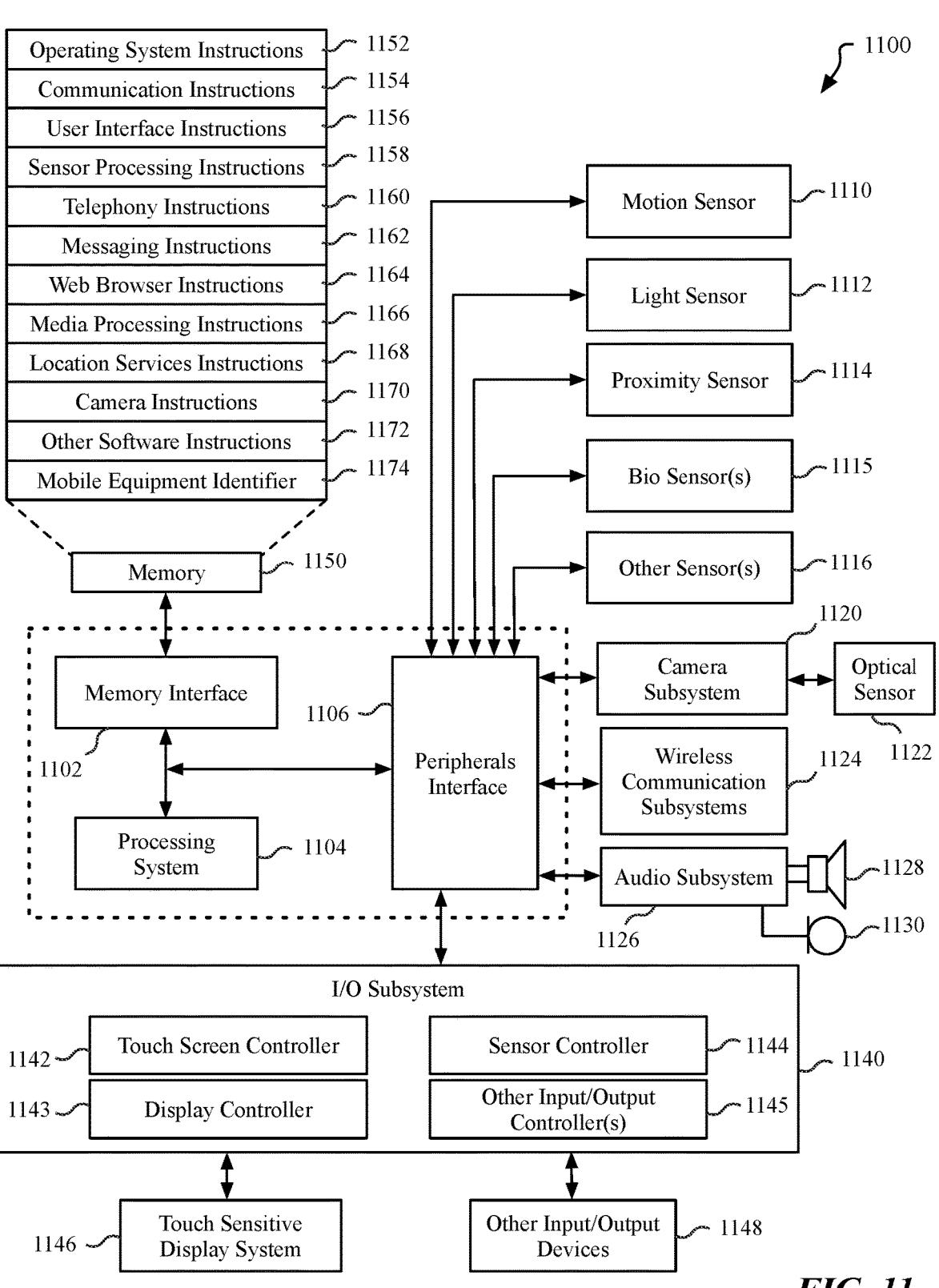
FIG. 11 is a block diagram of a device architecture for a mobile or embedded device, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. In an embodiment, the positioning system may have a radio processor capable of solving navigation equations to determine user position, velocity, and/or time by processing the signals broadcast. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
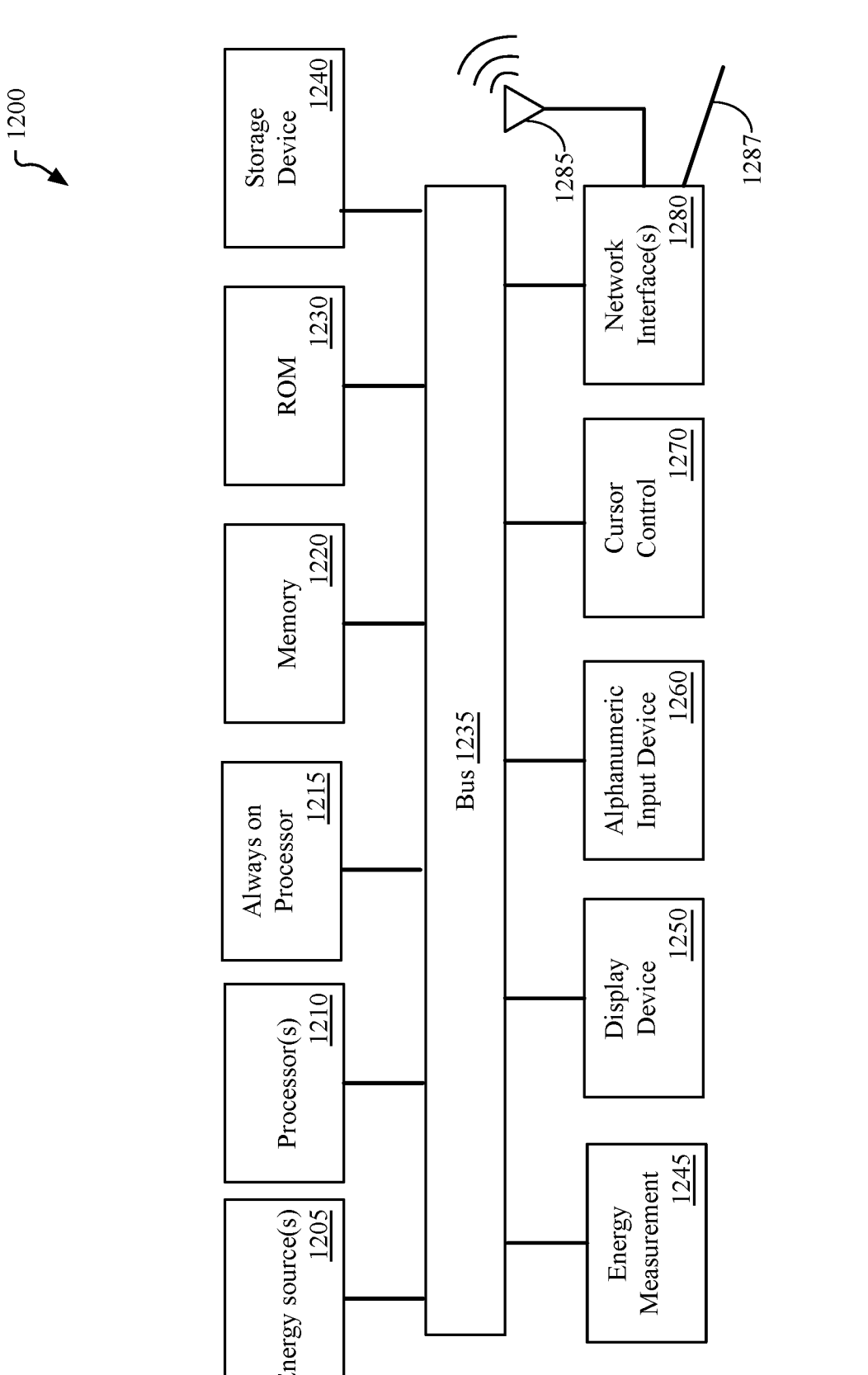
FIG. 12 is a block diagram of a computing system, according to an embodiment.

FIG. 12 is a block diagram of a computing system 1200, according to an embodiment. The illustrated computing system 1200 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1200 can be used to provide the computing device and/or a server device to which the computing device may connect.

The computing system 1200 includes bus 1235 or other communication device to communicate information, and processor(s) 1210 coupled to bus 1235 that may process information. While the computing system 1200 is illustrated with a single processor, the computing system 1200 may include multiple processors, low power processors, and/or co-processors. The computing system 1200 further may include memory 1220 in the form of random access memory (RAM) or other dynamic storage device coupled to the bus 1235. The memory 1220 may store information and instructions that may be executed by processor(s) 1210. In an embodiment, the memory 1420 may store instructions that may be executed by a low power processor 1415, such as the AOP. In an embodiment, the low power processor 1415 may be a component of a system on a chip (SOC) that remains powered when the remainder of the SOC is powered off.

Implementations of the low power processor 1415 may be found in U.S. Patent Application No. 11,079,261, which is herein incorporated by reference. The memory 1220 may also be main memory that is used to store temporary variables or other intermediate information during execution of instructions by the processor(s) 1210.

The computing system 1200 may also include read only memory (ROM) 1230 and/or another data storage device 1240 coupled to the bus 1235 that may store information and instructions for the processor(s) 1210. The data storage device 1240 can be or include a variety of storage devices, such as a flash memory device, a magnetic disk, or an optical disc and may be coupled to computing system 1200 via the bus 1235 or via a remote peripheral interface.

The computing system 1200 may also be coupled, via the bus 1235, to a display device 1250 to display information to a user. The computing system 1200 can also include an alphanumeric input device 1260, including alphanumeric and other keys, which may be coupled to bus 1235 to communicate information and command selections to processor(s) 1210. Another type of user input device includes a cursor control 1270 device, such as a touchpad, a mouse, a trackball, or cursor direction keys to communicate direction information and command selections to processor(s) 1210 and to control cursor movement on the display device 1250. The computing system 1200 may also receive user input from a remote device that is communicatively coupled via one or more network interface(s) 1280.

The computing system 1200 further may include one or more network interface(s) 1280 to provide access to a network, such as a local area network. The network interface(s) 1280 may include, for example, a wireless network interface having antenna 1285, which may represent one or more antenna(e). The computing system 1200 can include multiple wireless network interfaces such as a combination of Wi-Fi, Bluetooth®, near field communication (NFC), and/or cellular telephony interfaces. The network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, the network interface(s) 1280 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1200 can further include one or more energy sources 1205 and one or more energy measurement systems 1245. Energy sources 1205 can include an AC/DC adapter coupled to an external power source, one or more batteries, one or more charge storage devices, a USB charger, or other energy source. Energy measurement systems include at least one voltage or amperage measuring device that can measure energy consumed by the computing system 1200 during a predetermined period of time. Additionally, one or more energy measurement systems can be included that measure, e.g., energy consumed by a display device, cooling subsystem, Wi-Fi subsystem, or other frequently used or high-energy consumption subsystem.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A system to perform classification on an electronic device, the system comprising:
   one or more processors, wherein the one or more processors are to perform operations to:
   detect one or more conditions in user contextual data that trigger collection of historical positioning information comprising a set of historical positions for a lookback window;
   receive at least one historical position from the set of historical positions for the lookback window;
   classify the at least one historical position based on one or more features as a candidate location for a backtrack route; and
   provide the at least one historical position as part of the lookback window based on the classifications.

2. The system of claim 1, wherein the one or more conditions comprise at least one of an in transit motion classification, a threshold period of time without network access, a sparse environment classification, or a threshold distance from a frequented location.

3. The system of claim 1, wherein the one or more processors are to perform additional operations to:
   receive a request for the lookback window from an application
   in response to the request, classify one or more historical positions in the set of historical positions in the lookback window to locate a most recent candidate historical position to begin the backtrack route; and
   truncate a subset of the historical positions in the set of historical positions prior to the most recent candidate historical position.

4. The system of claim 3, wherein the one or more processors are to perform additional operations to:
   delete the subset of the historical positions from the electronic device.

5. The system of claim 3, wherein the application has an entitlement to request the lookback window.

6. The system of claim 1, wherein the one or more processors are to perform additional operations to:

analyze user context data to determine a set of conditions are met for proactively obtaining historical positioning information in an extended mode, wherein the extended mode comprises duty cycling position information requests to obtain intermittent position fixes.

7. The system of claim 1, wherein the one or more features comprises at least one of:

distance of the at least one historical position from a frequented location, a density of structures classification at the at least one historical position, an access point density at the at least one historical position, a motion classification of the electronic device at a collection of the at least one historical position, a change in a mode of transport classification of the electronic device between a time of the collection of the at least one historical position and a current time, or a user activity of the electronic device at the collection of the at least one historical position.

8. A non-transitory machine-readable medium storing instructions to cause one or more processors of an electronic device to perform operations comprising:

detecting one or more conditions in user contextual data that trigger collection of historical positioning information comprising a set of historical positions for a lookback window;

receiving at least one historical position from the set of historical positions or the lookback window;

classifying the at least one historical position based on one or more features as a candidate location or a backtrack route; and provide the at least one historical position as part of the lookback window based on the classification.

9. The non-transitory machine-readable medium of claim 8, wherein the one or more conditions comprise at least one of an in transit motion classification, a threshold period of time without network access, a sparse environment classification, or a threshold distance from a frequented location.

10. The non-transitory machine-readable medium of claim 8, wherein the one or more processors perform operations further comprising:

receiving a request for the lookback window from an application;

in response to the request, classifying one or more historical positions in the set of historical positions in the lookback window to locate a most recent candidate historical position to begin the backtrack route; and truncating a subset of the historical positions in the set of historical positions prior to the most recent candidate historical position.

11. The non-transitory machine-readable medium of claim 10, wherein the one or more processors perform operations further comprising:

deleting the subset of the historical positions from an electronic device.

12. The non-transitory machine-readable medium of claim 10, wherein the application has an entitlement to request the lookback window.

13. The non-transitory machine-readable medium of claim 8, wherein the one or more processors perform operations further comprising:

analyzing user context data to determine a set of conditions are met for proactively obtaining historical positioning information in an extended mode, wherein the extended mode comprises duty cycling position information requests to obtain intermittent position fixes.

14. The non-transitory machine-readable medium of claim 8, wherein the one or more features comprises at least one of:

distance of the at least one historical position from a frequented location, a distance of the at least one historical position from a current position, a density of structures classification at the at least one historical position, an access point density at the at least one historical position, a motion classification of the electronic device at a collection of the at least one historical position, a change in a mode of transport classification of the electronic device at the collection of the at least one historical position and a current time, or a user activity of the electronic device at the collection of the at least one historical position.

15. A method performed by an electronic device comprising:

detecting one or more conditions in user contextual data that trigger collection of historical positioning information comprising a set of historical positions for a lookback window;

receiving at least one historical position from the set of historical positions for the lookback window;

classifying the at least one historical position based on one or more features as a candidate location for a backtrack route; and provide the at least one historical position as part of the lookback window based on the classification.

16. The method of claim 15, wherein the one or more conditions comprise at least one of an in transit motion classification, a threshold period of time without network access, a sparse environment classification, or a threshold distance from a frequented location.

17. The method of claim 15, further comprising:

receiving a request for the lookback window from an application;

in response to the request, classifying one or more historical positions in the set of historical positions in the lookback window to locate a most recent candidate historical position to begin the backtrack route; and truncating a subset of the historical positions in the set of historical positions prior to the most recent candidate historical position.

18. The method of claim 17, further comprising:

deleting the subset of the historical positions from the electronic device.

19. The method of claim 17, wherein the application has an entitlement to request the lookback window.

20. The method of claim 15, further comprising:

analyzing user context data to determine a set of conditions are met for proactively obtaining historical positioning information in an extended mode, wherein the extended mode comprises duty cycling position information requests to obtain intermittent position fixes.

21. The method of claim 15, wherein the one or more features comprises at least one of:

a distance from a frequented location, a distance of the at least one historical position from a current position, a density of structures classification at the at least one historical position, an access point density at the at least one historical position, a motion classification of the electronic device at a collection of the at least one historical position, a change in a mode of transport classification of the electronic device at the collection of the at least one historical position and a current time, or a user activity of the electronic device at the collection of the at least one historical position.

* * * * *